(12) United States Patent
Namiki (10) Patent No.: US 11,084,168 B2
(45) Date of Patent: Aug. 10, 2021

(54) ARTICLE STACKING APPARATUS AND MACHINE LEARNING APPARATUS

(71) Applicant: FANUC CORPORATION, Yamanashi (JP)

(72) Inventor: Yuta Namiki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 97 days.

(21) Appl. No.: 16/104,682

(22) Filed: Aug. 17, 2018

(65) Prior Publication Data

US 2019/0061151 A1 Feb. 28, 2019

(30) Foreign Application Priority Data

Aug. 23, 2017 (JP) .............................. JP2017-160540

(51) Int. Cl.
| | |
|---|---|
| *G06F 7/00* | (2006.01) |
| *B25J 9/16* | (2006.01) |
| *B65G 57/00* | (2006.01) |
| *B25J 15/00* | (2006.01) |
| *B65G 57/02* | (2006.01) |

(52) U.S. Cl.
CPC ............ *B25J 9/163* (2013.01); *B25J 9/1692* (2013.01); *B25J 15/00* (2013.01); *B65G 57/00* (2013.01); *B65G 57/02* (2013.01); *G05B 2219/40006* (2013.01)

(58) Field of Classification Search
None
See application file for complete search history.

(56) References Cited

U.S. PATENT DOCUMENTS

| | | | |
|---|---|---|---|
| 9,102,055 B1* | 8/2015 | Konolige | B65G 47/50 |
| 9,205,558 B1 | 12/2015 | Zevenbergen et al. | |
| 9,427,874 B1* | 8/2016 | Rublee | B25J 11/0075 |
| 2016/0229061 A1 | 8/2016 | Takizawa et al. | |
| 2017/0146341 A1 | 5/2017 | Kimoto et al. | |
| 2017/0157767 A1 | 6/2017 | Takamizawa | |
| 2019/0184554 A1* | 6/2019 | Yamazaki | B25J 9/1697 |
| 2020/0026988 A1* | 1/2020 | Guo | G06K 9/6215 |

FOREIGN PATENT DOCUMENTS

| | | |
|---|---|---|
| DE | 102016014264 A1 | 7/2017 |
| JP | S62251811 A | 11/1987 |
| JP | H0485201 A | 3/1992 |
| JP | H6-114770 A | 4/1994 |
| JP | H06182684 A | 7/1994 |
| JP | H09190483 A | 7/1997 |
| JP | 2000076220 A | 3/2000 |

(Continued)

*Primary Examiner* — Yolanda R Cumbess (74) *Attorney, Agent, or Firm* — Hauptman Ham, LLP (57) ABSTRACT

A machine learning apparatus of an article stacking apparatus observes, as a state variable representing the current environmental state, stacking status data indicating the stacking status of an article stacking area and article information data indicating information on an article to be stacked, and acquires, as label data, article placement data indicating a placement of the article in the stacking area. The machine learning apparatus learns article placement data in association with the stacking status data and the article information data using the state variable and the label data.

8 Claims, 8 Drawing Sheets

(56) References Cited

FOREIGN PATENT DOCUMENTS

| | | |
|---|---|---|
| JP | 2000109218 A | 4/2000 |
| JP | 2001249970 A | 9/2001 |
| JP | 2016144841 A | 8/2016 |
| JP | 2017064910 A | 4/2017 |
| JP | 2017094428 A | 6/2017 |
| WO | 2016010968 A1 | 1/2016 |

* cited by examiner

| ID | SHAPE | WEIGHT | USAGE |
|---|---|---|---|
| 010001 | CUBOID 20x30x10 | 3kg | USAGE A |
| 010002 | CUBOID 20x30x10 | 2kg | USAGE B |
| 010003 | CYLINDER 10x50 | 4kg | USAGE A |
| 010004 | CUBOID 20x100x10 | 8kg | USAGE C |
| ... | ... | ... | ... |

ARTICLES PLACED
IN STACKING AREA

SHAPE OF WHOLE STACK
OF ALL ARTICLES

FIG. 9

ARTICLE STACKING APPARATUS AND MACHINE LEARNING APPARATUS

RELATED APPLICATIONS

The present application claims priority to Japanese Application Number 2017-160540, filed on Aug. 23, 2017, the disclosure of which is hereby incorporated by reference herein in its entirety.

BACKGROUND OF THE INVENTION

1. Field of the Invention

The present invention relates to an article stacking apparatus and a machine learning apparatus, and particularly to an apparatus for stacking articles using a robot and a machine learning apparatus.

2. Description of the Related Art

Systems that use a robot to grip and transfer an article, place articles flat, or stack articles in layers are often used. In such systems, a pattern of places where articles to be transferred are placed is specified in advance, and a robot places articles in accordance with the pattern. One example of prior art techniques relating to the stacking of articles is disclosed in Japanese Patent Application Laid-Open No. 06-114770. In this technique, a pattern of places where workpieces to be transferred are placed is specified in advance, an appropriate pattern is selected in accordance with the outer shape of a workpiece that is being transferred, and the workpiece is loaded in the place which is appropriate for the workpiece.

However, when articles should be stacked in different places in accordance with properties (such as size, shape, and weight) of the articles, for example, when large or heavy articles are stacked in lower layers, or when articles having shapes that decrease stability are stacked in upper layers, workpieces cannot be simply stacked in accordance with a pattern.

In some instances, stacking in a pattern that is not preset in a system is advantageous because it has good loading efficiency. Also, patterning the stacking is difficult. For example, while a stacking pattern can be easily predefined for articles that are equal-sized cuboids, a pattern cannot be easily predefined for articles that have different sizes or that are not cuboids.

Further, when information of the articles that need to be stacked, such as the size and shape, cannot be obtained in advance, the system needs to predict possible positions for stacking the articles optimally. This is because even if an article can be immediately placed in a place, placing the article in the place may sometimes be undesirable. For example, when a relatively small-sized article comes and is stacked first, a large-sized article cannot be mounted on the foregoing article. In such a case, a measure such as temporarily placing an article before stacking the article at a final stacking position is needed.

SUMMARY OF THE INVENTION

Accordingly, an object of the present invention is to provide an article stacking apparatus and a machine learning apparatus, which enable articles to be appropriately stacked in accordance with properties of articles and site situations.

To solve the above-described problems, an article stacking apparatus of the present invention includes a machine learning apparatus for determining an estimate placement to stack an article, of a plurality of articles in accordance with article information including, for example, properties of the article to be stacked. The machine learning apparatus performs learning using learning data acquired at a setting area where the article has already been stacked by a worker to determine an estimate placement of an article. The estimate placement of the article can be changed in accordance with properties of the article and site situations. The article stacking apparatus of the present invention conveys and stacks a plurality of articles in accordance with the estimate placement outputted from the machine learning apparatus.

According to one aspect of the present invention, an article stacking apparatus controls a robot to stack a plurality of articles set in a setting area into a stacking area. The article stacking apparatus includes a machine learning apparatus for determining an estimate placement to stack an article, of a plurality of articles, in the stacking area based on stacking status of the stacking area, property information of the articles, and placement information of the article in the setting area. The machine learning apparatus includes: a state observation section for observing stacking status data indicating the stacking status of the stacking area and article property data indicating information of the articles to be stacked as a state variable representing a current environmental state; a label data acquisition section for acquiring article placement data indicating the placement of the article in the setting area as label data; and a learning section for learning a correlation between the label data and the state variable.

The article placement data may further indicate a temporary placement of the article.

The learning section may include: an error calculation section for calculating an error between an output of a correlation model and a correlation feature, the correlation model deriving the article placement data from the stacking status data and the article property data, the correlation feature being identified from teacher data prepared in advance; and a model update section for updating the correlation model to reduce the error.

The learning section may calculate the state variable and the label data using a multi-layered structure.

The machine learning apparatus may further include an estimation result output section configured to determine the estimate placement of the article, of the plurality of articles, to be stacked by the robot into the stacking area based on the correlation of the label data and the state variable learned by the learning section, and output a result of the determination of the estimate placement of the article in the stacking area.

The machine learning apparatus may be on a cloud server.

The estimate result output section of the machine learning apparatus may determine the estimate placement of the article using the state variable and the label data acquired by the label data acquisition section and the state observation section from operations performed by workers with a plurality of article stacking apparatuses.

According to another aspect of the present application, a machine learning apparatus determines an estimate placement of an article, of a plurality of articles, to be stacked in a stacking area based on stacking status of the stacking area, and property information of the articles, and placement information of the article in a setting area. The machine learning apparatus includes: a state observation section for observing stacking status data indicating the stacking status of the stacking area, and article property data indicating the information of the articles to be stacked as a state variable representing a current environmental state; a label data acquisition section for acquiring article placement data while the article is placed in the setting area; and a learning section for learning a correlation between the label data and the state variable data.

According to the present invention, an appropriate placement of an article to be stacked in a stacking area can be determined in accordance with properties of articles and site situations.

DETAILED DESCRIPTION OF THE PREFERRED EMBODIMENT

Figure 1:
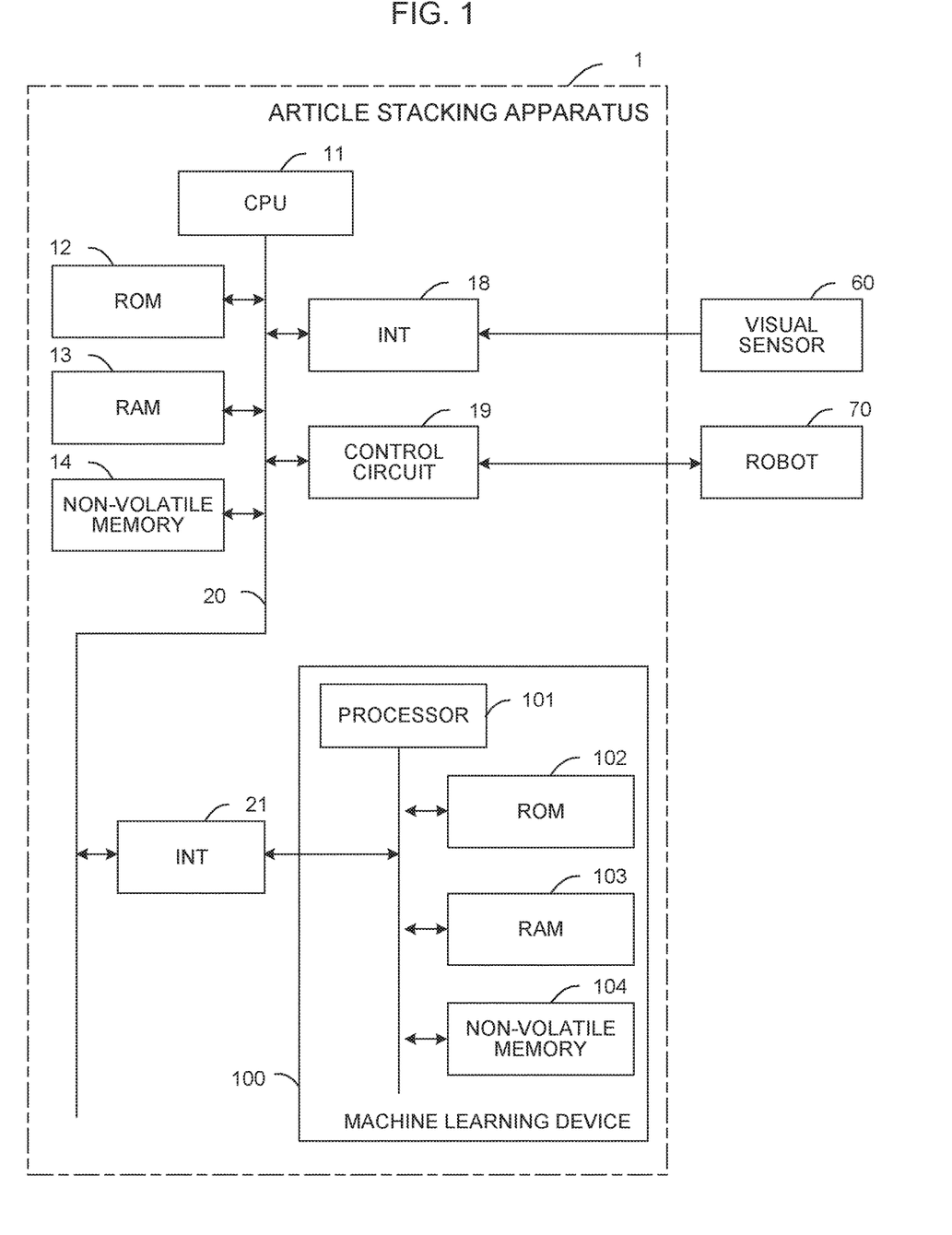
FIG. 1 is a schematic hardware configuration diagram of an article stacking apparatus according to one embodiment.

FIG. 1 is a schematic hardware configuration diagram showing principal portions of an article stacking apparatus according to a first embodiment.

An article stacking apparatus 1 is implemented as a robot controller for controlling a robot 70. A CPU 11 of the article stacking apparatus 1 according to the present embodiment is a processor that wholly controls the article stacking apparatus 1. The CPU 11 retrieves a system program stored in a ROM 12 through a bus 20, and controls the entire article stacking apparatus 1 in accordance with the system program. A RAM 13 temporarily stores data such as temporary calculation data and various kinds of data inputted by an operator through an input section which is not illustrated in FIG. 1.

A non-volatile memory 14 uses an unillustrated battery for memory backup even when the power of the article stacking apparatus 1 is shut off. The non-volatile memory 14 stores various kinds of data such as data concerning an article to be stacked, setting values to be used to control article stacking operation by a robot, and similar information. This various data can be inputted through an unillustrated input section by an operator, or using control programs inputted through an unillustrated interface. Such programs and various kinds of data stored in the non-volatile memory 14 may be loaded into the RAM 13 at the time of execution/use. Moreover, the ROM 12 has programs previously written therein, which include a publicly-known analysis program for analyzing an article to be stacked, and the stacking status of articles in a stacking area based on a detection value (captured image data) detected by a visual sensor 60. The ROM also contains system programs such as a system program for controlling communication with the machine learning apparatus 100, which will be described later.

The visual sensor 60 is used to detect the states of articles placed in the stacking area in a learning phase of a machine learner, and is used to detect an article to be stacked in a phase in which the article stacking apparatus 1 stacks articles. The visual sensor 60 may be, for example, an image capture device fixed in place in a workplace or may be an image capture device attached to a robot arm of the robot 70. The visual sensor 60 passes a detected detection value (captured image data) to the CPU 11 through an interface 18.

A control circuit 19 receives commands from the CPU 11 and controls the stacking operation of the robot 70. The control circuit 19 controls the operation of a robot hand that grips an article or controls motors for driving joints of the robot 70 to perform control so that the gripped article may be moved to a specified location in the stacking area. Details of control techniques relating to the article stacking operation of the robot 70 are already publicly known, and an explanation thereof is omitted in this specification.

An interface 21 connects the article stacking apparatus 1 and the machine learning apparatus 100. The machine learning apparatus 100 includes a processor 101 for controlling the entire machine learning apparatus 100, a ROM 102 for storing system programs, a RAM 103 for storing temporary data in processes involved in machine learning, and a non-volatile memory 104 for storing a learning model. The machine learning apparatus 100 can observe, through the interface 21, various kinds of information (information on an article detected by the visual sensor 60, the stacking status of articles in the stacking area, and other information), that is acquired by the article stacking apparatus 1. Further, the article stacking apparatus 1 receives an article placement command outputted from the machine learning apparatus 100 and controls the article stacking operation of the robot 70.

Figure 2:
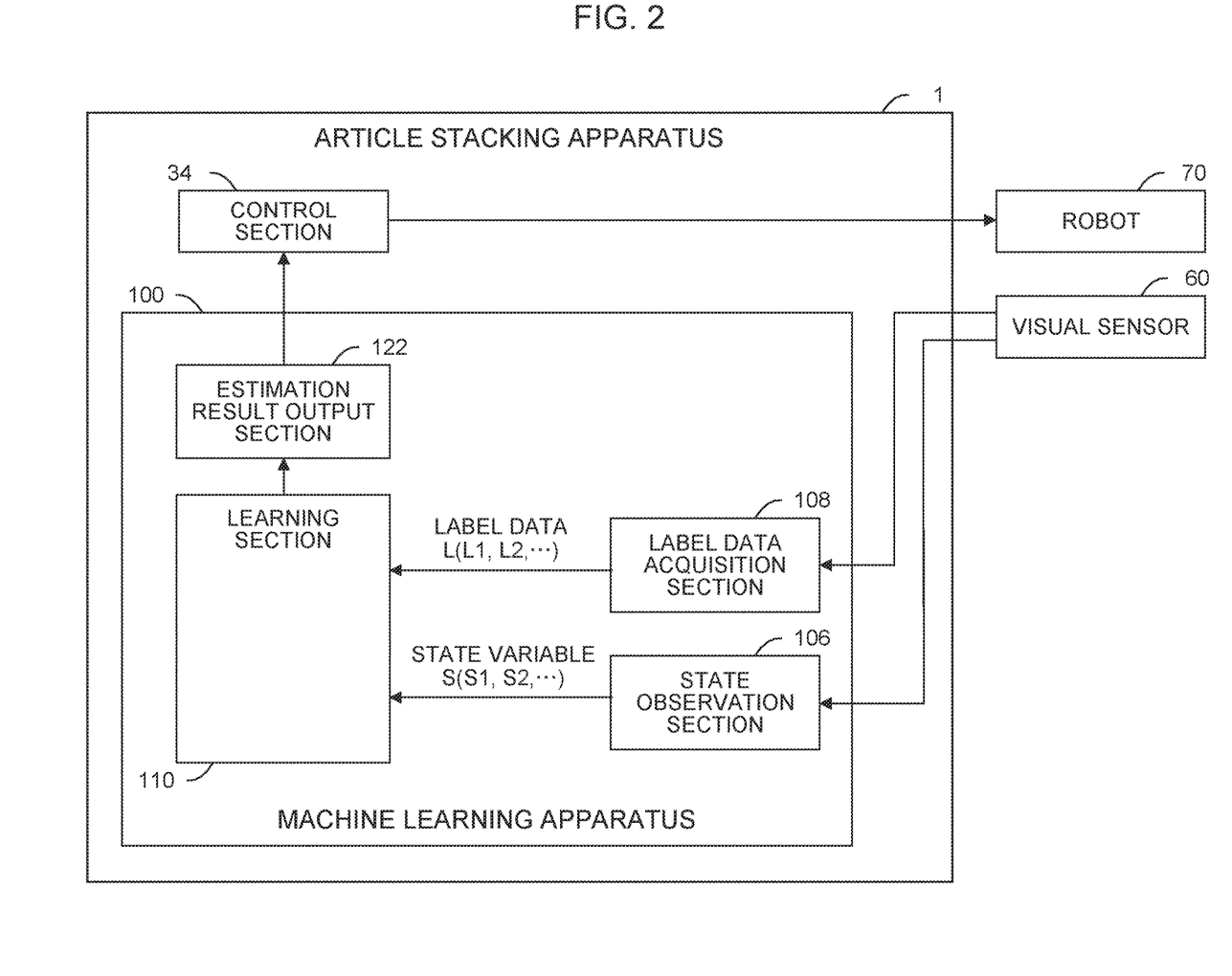
FIG. 2 is a schematic functional block diagram of the article stacking apparatus according to the one embodiment.

FIG. 2 is a schematic functional block diagram showing the article stacking apparatus 1 and the machine learning apparatus 100 according to a first embodiment.

Each functional block shown in FIG. 2 is realized by the CPU 11 of the article stacking apparatus 1 and the processor 101 of the machine learning apparatus 100, which are shown in FIG. 1. The CPU 11 and the processor 101 executes the respective system programs and controls the operation of each section of the article stacking apparatus 1 and the machine learning apparatus 100.

The article stacking apparatus 1 of the present embodiment includes a control section 34 for controlling the robot 70. The control section 34 controls the robot 70 based on a placement command for an article to be stacked which is outputted from the machine learning apparatus 100. The control section 34 controls the robot 70 to grip the load/article to be stacked, and places the article in a specified location in the stacking area.

The machine learning apparatus 100 of the present embodiment includes software (such as learning algorithm) and hardware (such as the processor 101) for determining an estimate placement of an article to be stacked in a stacking area, by machine learning, based on a past placement of the article in a setting area, property information of articles in the setting area, and a stacking status of the stacking area. The machine learning apparatus 100 learns a model structure representing the correlation between (i) the stacking status of the stacking area and property information of the articles in the setting area and (ii) the past placement of the article in the setting area.

As represented by the functional blocks in FIG. 2, the machine learning apparatus 100 of the article stacking apparatus 1 includes a state observation section 106, a label data acquisition section 108, a learning section 110, and an estimation result output section 122. The state observation section 106 observes a state variable S indicating the current environmental state, which includes stacking status data S1 and article property data S2. The stacking status data S1 indicates the stacking status of the stacking area, and article property data S2 indicates property information of articles in the setting area to be stacked. The label data acquisition section 108 acquires label data L of the article to be stacked while the article is set in the setting area. The label data L includes article placement data L1 indicating a past placement of the article in the setting area prior to being stacked. The learning section 110 learns a correlation between (i) the article placement data L1 and (ii) the stacking status data S1 and the article property data S2, using the state variable S and the label data L. The estimation result output section 122 determines an estimate placement of the article to be stacked in the stacking area based on the learned correlation and outputs a result of the determination of the estimate placement of the article to be stacked.

State Observation Section 106

The state observation section 106 may be configured as one function of the processor 101 or be configured as software stored in the ROM 102 to cause the processor 101 to work. The state variable S observed by the state observation section 106 includes the stacking status data S1, which includes a set of respective placements of articles in the stacking area.

The stacking status data S1 can be acquired from a history of past placements of articles in the stacking area by the robot 70. In this case, the machine learning apparatus 100 may temporarily store a history of placements of articles in the stacking area by the robot 70 in the RAM 103. The state observation section 106 may use the history of placements of articles in the stacking area to acquire the stacking status data S1.

Figure 8:
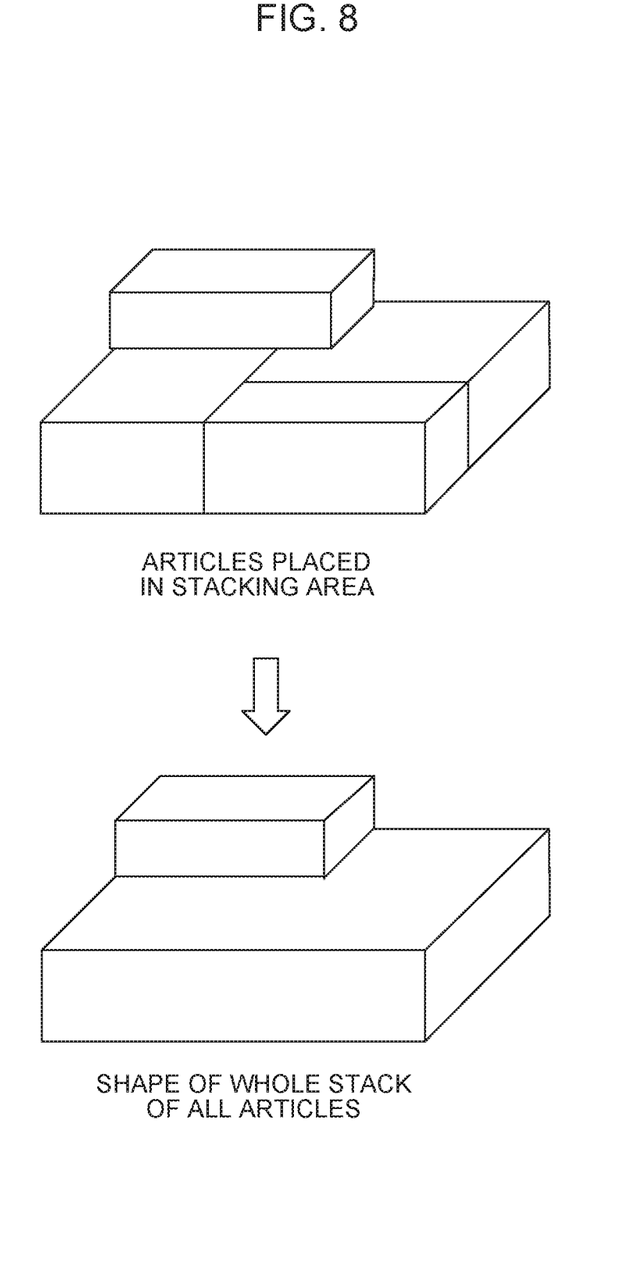
FIG. 8 is a view showing an example in which learning is performed using the shape of the whole stack of articles placed in a stacking area.

In another case, during learning by the learning section 110, the stacking status data S1 is obtained by the visual sensor 60, which detects respective placements at a given point in time of articles already placed in the stacking area by a worker at an article stacking site. The stacking status data S1 may be stored in a table containing the shapes, weights, positions, orientations, and other features of each of the articles already placed in the stacking area at a given point in time, or the stacking status data S1 may be stored in a table containing the unified shape (FIG. 8) of all articles already placed in the stacking area.

Figure 3:
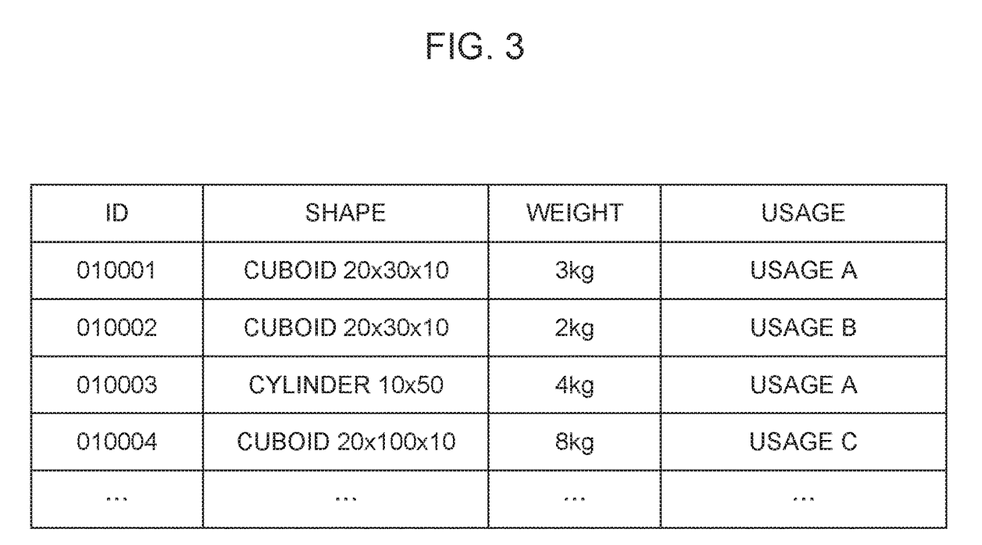
FIG. 3 is a view showing an example of information concerning articles.

The article property data S2 of the state variable S is acquired using the visual sensor 60 that reads an ID information, such as an identification code attached or printed on a surface of the article, when the article is conveyed to a setting area. In this case, various kinds of data including properties of each article are measured in advance. These various properties, such as the shape of each article, the weight of the article, and a processing step that uses the article, are stored in advance in a memory in association with the ID information for uniquely identifying the article as shown in FIG. 3. Using the identification code read by the visual sensor 60, data concerning the article properties stored in the non-volatile memory 14 in advance is acquired. The state observation section 106 includes the acquired data of the article to be stacked in the article property data S2. Further, an identification code, instead of direct information of the article, may be added to the article property data S2. In this case, data concerning the article to be stacked can be acquired by using the identification code from the table in FIG. 3. The article property data S2 contain information on articles that are known. Alternatively, rather than being read using an identification code, the shape and other features of an article may be directly acquired by the visual sensor 60 when the article is conveyed to the setting area. Examples of other data concerning an article may include information such as the material or fragility of the article, and a history of operations performed on the article, which is not shown in FIG. 3.

Label Data Acquisition Section 108

The label data acquisition section 108 may be configured as one function of the processor 101, or be configured as software stored in the ROM 102 to cause the processor 101 to work. During the learning phase by the learning section 110, the label data acquisition section 108 acquires the article placement data L1, indicating a past placement of an article to be stacked while the article is set by a worker in the setting area, as the label data L. In another case, the article placement data L1 may include the same data as contained in the stacking status data S1. While the stacking status data S1 contains information of all articles already placed in a stacking area at a given point in time, the article placement data L1 contains placement information on one or more articles in the setting area to be placed in the stacking area at a given point in time. When one or more articles have been placed in the stacking area, learning may be performed by regarding the one or more articles as articles placed one by one, or regarding the plurality of placed articles together. Further when one or more articles have been placed in the stacking area by a worker, the article placement data L1 is obtained by the visual sensor 60 that detects a placement of the one or more articles which have been placed in the stacking area by the worker. The label data acquisition section 108 data is used during learning by the learning section 110, but is not an essential component for the machine learning apparatus 100 after the learning section 110 completes the learning.

Learning Section 110

The learning section 110 may be configured as a function of the processor 101 or be configured as software stored in the ROM 102 to cause the processor 101 to work. The learning section 110 learns a correlation between the label data L (article placement data L1 indicating a past placement of an article in the setting area to be stacked in the stacking area) and the state variable S (stacking status data S1 indicating the stacking status of the stacking area and article property data S2 indicating information of the plurality of articles in the setting area to be stacked in the stacking area), in accordance with an arbitrary learning algorithm generically called machine learning. The learning section 110 can learn the correlation between both of the stacking status data S1 and the article property data S2, which is the state variable S, and the article placement data L1, which is included in the label data L. The learning section 110 can repeatedly execute learning based on a data collection that includes the state variable S and the label data L.

The learning section 110 of the present invention, is configured to determine a desirable way to stack articles by using the following method.

Learning Process

Figure 4:
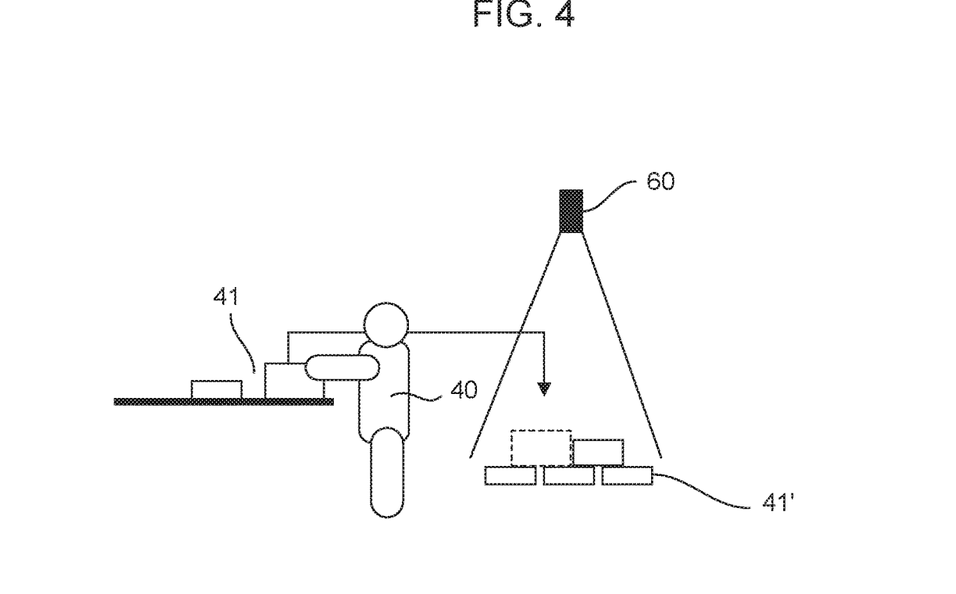
FIG. 4 is a view for explaining the operation of the article stacking apparatus according to the one embodiment at the time of learning.

FIG. 4 is a view showing an article stacking site at the time of learning. It should be noted that the article stacking apparatus 1 is omitted in FIG. 4.

At the time of learning, articles 41 are set in the setting area before being stacked in the stacking area. A human, such as a worker, or conveying means such as a conveyor, may move one or more articles to the setting area. As shown in FIG. 4, a worker 40 stacks the articles 41 in the stacking area by gripping the articles 41 in the setting area and placing the articles in the stacking area.

Hereinafter, at the time of learning, one way of acquiring learning data including the article placement data L1, stacking status data S1, and article property data S2 will be described.

The article placement data L1 is acquired while the articles are set in the setting area. A visual sensor 60 may be used to detect a placement of one or more articles in the setting area for obtaining placement information of the one or more articles.

The stacking status data S1 is acquired as an environment state of the stacking area. At the initial state, a pallet, or a basket, on which articles are placed is laid in the stacking area. In this example, a pallet (not shown) is laid. The pallet has no articles placed thereon. While nothing is placed in the stacking area in the initial state, information indicating that nothing is placed is recorded as the stacking status of the stacking area. At this point of time, it is possible to have all articles to be stacked into the stacking area set in the setting area, or only some of the articles set in the setting area. When only some of articles are set in the setting area, an article may be newly conveyed to the setting area every time a worker places an article in the stacking area. Information for additional articles may be updated for the stacking status data S1 every time an article is conveyed to the setting area and an article is placed in the stacking area.

The stacking status data S1 can be obtained by the visual sensor 60. As shown in FIG. 4, the visual sensor 60 is disposed above the stacking area and can measure the position of the articles 41' in the stacking area. If the heights of articles are not fixed, the visual sensor 60 is also capable of acquiring three-dimensional information of the articles.

Further, as mentioned above, during learning, the worker picks up an article from the setting area and places the article into the stacking area. The worker then checks the status of the stacking area and places the article in an appropriate location. The visual sensor 60 disposed above the stacking area acquires information such as the position and the orientation of an article 41' placed at an appropriate time, as stacking information of the stacking status of the stacking area. The stacking information is acquired when the worker presses a button of a machine control panel (not shown) connected to the article stacking apparatus 1. Alternatively, the stacking information is acquired at a certain period of time after the status of the stacking area monitored by the visual sensor 60 has changed.

A determination of which article of the articles set in the setting area is to be placed in the stacking area may be performed by using the information obtained from the visual sensor 60 to search article property information stored in the non-volatile memory 14. The searched information may include picking sequence data for a similar article, or sequence data from the identification code attached to the article or printed on a surface of the article.

Article property data S2 indicating properties of the articles in the setting area at a given point in time can be obtained by some means. For example, as described previously, property information of the plurality of articles to be conveyed to the setting area is stored in the non-volatile memory 14 of the article stacking apparatus 1 in advance so that the properties of the articles to be conveyed to the setting area can be acquired. Alternatively, although it is not shown in FIG. 4, a sensor, such as the visual sensor, may be disposed in the setting area so that properties of the articles in the setting area can be acquired via information obtained from the sensor when the worker grips the articles in the setting area.

Property information of the plurality of articles in the setting area may include a physical quantity (size, shape, weight, or material) of the article, a history of operations performed on the article, or an ID uniquely assigned to the article. With respect to the size and the weight of an article, instead of the absolute value thereof, a value obtained by transforming the absolute value in accordance with some equations may be used. For example, when one site deals with articles ranging in weight from 10 kg to 100 kg and another site deals with articles ranging in weight from 100 g to 1 kg, normalized weights are used in learning to enable versatile learning for various sites.

During one learning cycle, one set of stacking status data S1, article property data S2, and article placement data L1 is stored at one step in which the worker grips the article from the setting area and places the article to the stacking area.

In one example, when the worker picks two or more articles at the setting area and then places the two or more articles into the stacking area at a time, those articles may be stored as one set or as two or more sets. When an article is picked up from the setting area and placed in the stacking area, the property information regarding the article may be deleted from the property information of articles (article property data S2) stored in the non-volatile memory 14, or a flag indicating that the article has already been placed in the stacking area may be turned on. By adding the current placement of the article in the stacking area to the previous stacking status of the stacking area, the current stacking status (stacking status data S1) to be used in the next stage is created.

During the learning phase, the worker moves the articles from the setting area and stacks the articles in the stacking area until there are no more articles left in the setting area or until the stacking area is full. Thus, the number of times that the stacking is performed by the worker is the same as number of sets of the stacking status of the stacking area, the property of the article, and a placement of the article in the setting area.

The sets of the stacking status of the stacking area, the property of the article, and the placement of the article in the setting area are used as data for learning. Learning is performed for each step in which the worker grips an article and places the article in the stacking area using the state variable including the stacking status data S1 indicating a stacking status of the stacking area, article property data S2 indicating the property of the article, and the label data L including the article placement data L1 indicating a placement of the article in the setting area. Learning may be performed using data obtained during the operation by the worker immediately after the data is obtained. Alternatively, offline learning may be performed using data accumulated after a certain number of sets of the stacking status data S1, article property data S2, and article placement data L1 is obtained.

By repeating the above-described learning cycle, the learning section 110 can automatically identify features implying the correlation between both of the stacking status of the stacking area (stacking status data S1) and article property of an article to be stacked (article property data S2) and a placement of the article to be stacked (article placement data L1). When the learning algorithm is started, the correlation between both of the stacking status data S1 and the article property data S2 and the article placement data L1 is substantially unknown. The learning section 110 gradually identifies features and interprets the correlation as learning progresses. When the correlation between both of the stacking status data S1 and the article property data S2 and the article placement data L1 is interpreted to some reliable level, learning results repeatedly outputted by the learning section 110 can be used to determine where an article to be stacked should be placed for future stacking operations. Specifically, as the learning algorithm progresses, the learning section 110 can gradually move the correlation between both of the stacking status data S1 of the stacking area and article property data S2, and article placement data L1 toward an optimal solution.

Estimation Result Output Section 122

The estimation result output section 122 determines an estimate placement of the article to be stacked based on the stacking status of the stacking area and information of an article to be stacked using the correlation learned by the learning section 110, and outputs the estimated placement to the control section 34. After the learning section 110 has completed the learning phase, when the stacking status of the stacking area and information of an article to be stacked are inputted to the machine learning apparatus 100, the estimation result output section 122 outputs an appropriate placement of the article to be stacked.

Stacking by Robot after Learning

Figure 5:
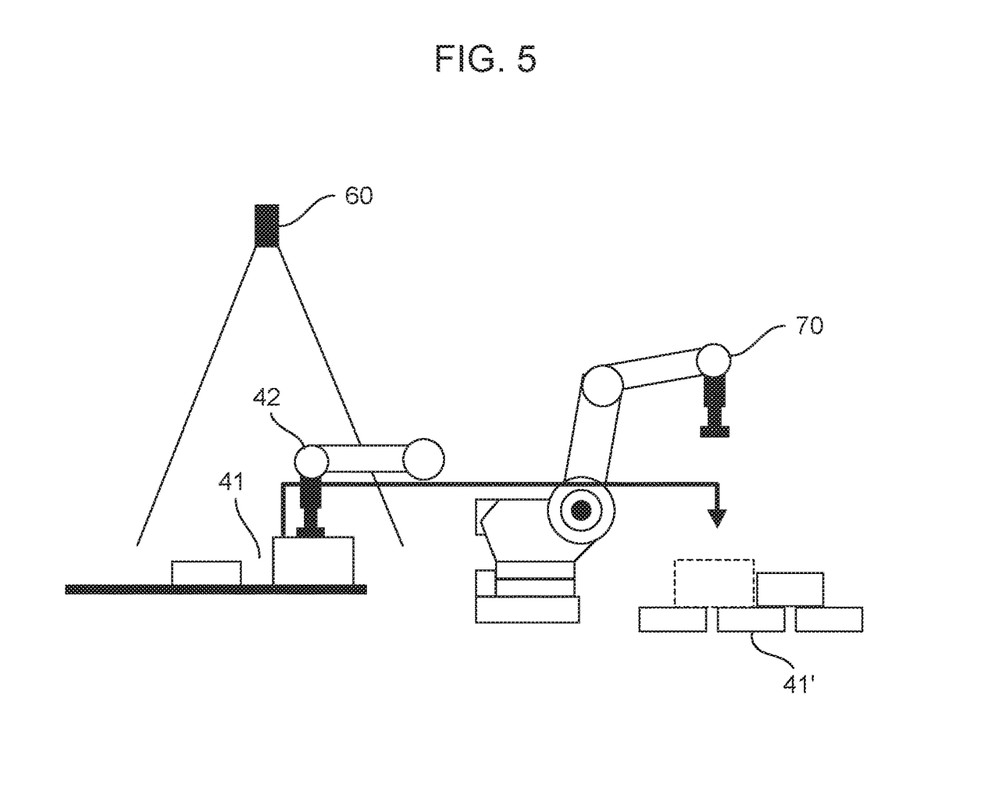
FIG. 5 is a view for explaining the operation of the article stacking apparatus according to the one embodiment which is performed when a robot is controlled.

FIG. 5 is a view showing a situation in which, after the learning section 110 completes learning, the robot 70 is controlled to stack an article based on an estimate of a placement of an article that has been outputted from the estimation result output section 122.

A robot hand is attached to a tip of the robot 70. By controlling the robot hand, the robot 70 can grip an article. Articles 41 are set in the setting area before being placed in the stacking area. The conveyance of loads to the setting area may be manually performed by a human such as a worker or by a conveying means such as a conveyor. The robot 70 grips an article 41 from the setting area with the robot hand 42, moves the article 41 to the stacking area, and places the article 41 in a stack according to the output from the estimation result output section 122 described above.

The visual sensor 60 is disposed above the setting area to measure the position of an article. If the heights of articles are not determined, the visual sensor 60 is capable of acquiring three-dimensional information. However, it is not necessary to dispose the visual sensor 60 above the setting area if information of the position of an article 41 laid in the setting area and the ID of the article 41 can be acquired by an alternative means in the system.

Hereinafter, a method in which the robot 70 performs stacking using the learned correlation by the learning section 110 which has finished learning will be described.

First, the state observation section 106 identifies one or more articles 41 laid in the setting area to be stacked, and acquires property information of the identified article(s) 41. Then, the state observation section 106 acquires the stacking status of the stacking area for stacking status data S1. The stacking status of the stacking area may be acquired by the visual sensor 60 disposed above the stacking area. However, if no visual sensor 60 is disposed above the stacking area, placement information can be created from a history of past placements of articles in the stacking area by the robot 70. When the system relies on a history of past placement information to create placement information for a current stacking status, the placement information may be created as time-series data obtained as articles are placed in order one by one from an initial state where no article has yet been placed.

After the state observation section 106 observes placement information on the stacking area and property information of articles, the estimation result output section 122 estimates a placement of the article to be stacked according to the learning result outputted by the learning section 110 and outputs the estimated placement. The estimated placement indicates a position that an article should be placed. Based on the results of the estimation result output section 122, the control section 34 controls the robot 70 to pick up the article from the setting area to the specified position in the stacking area. This operation is performed until there are no more articles left in the setting area or until the stacking area is full.

Modified Example—Temporary Placement of the Article

In one modified example of the machine learning apparatus 100 of the article stacking apparatus 1, the article may be temporarily placed in a temporary placement area. In this case, in addition to information indicating a normal placement of the article in the stacking area, information indicating a temporary placement of the article is prepared as the article placement data L1. When the worker places a load/article in the temporary placement area, information indicating a temporary placement of the load/article is used as the article placement data L1. Moreover, the temporarily placed article is treated as being left in the setting area, and the position in which the article is set is changed to the position at which the article is temporarily placed in the temporary placement area.

In the above-described modified example, the machine learning apparatus 100 can also estimate, in addition to a placement of the article in the normal stacking area, a temporary placement of the article in the temporary placement as needed, based on inputs of the stacking status of the stacking area (stacking status data S1) and property information of an article to be stacked (article property data S2). Therefore, the robot 70 can perform more flexible stacking operations.

In the machine learning apparatus 100 having the above-described configuration, the learning algorithm that the learning section 110 executes is not particularly limited, and any learning algorithm publicly known as machine learning can be employed.

Supervised Learning Algorithm

Figure 6:
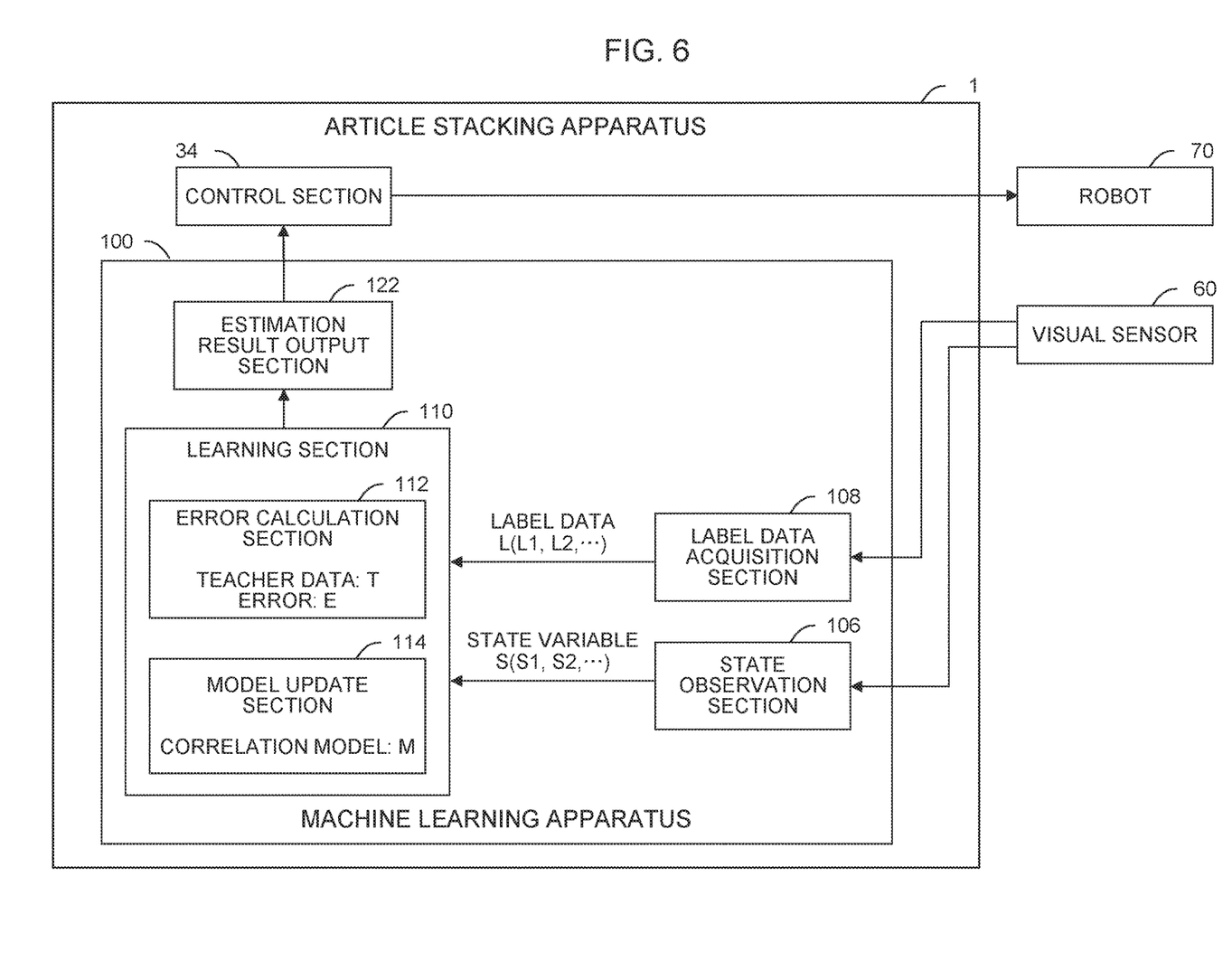
FIG. 6 is a schematic functional block diagram showing one aspect of the article stacking apparatus.

FIG. 6 shows another configuration of the article stacking apparatus 1 shown in FIG. 2, which includes the learning section 110 that executes supervised learning as another example of a learning algorithm. In supervised learning, known data sets (called teacher data) of an input and an output corresponding to the input are given, and, from the teacher data, the features implying the correlation between the input and the output are identified. Accordingly, a correlation model for estimating a required output for a new input is learned based on the teacher data.

In the machine learning apparatus 100 of the article stacking apparatus 1 shown in FIG. 6, the learning section 110 includes an error calculation section 112 and a model update section 114.

Error Calculation Section 112

The error calculation section 112 calculates an error E (a deviation) between a correlation model M and a correlation feature identified from teacher data T, the teacher data T being obtained from article stacking operations performed by a worker in the setting area. The correlation model M is used by the estimation result output section 122 to estimate a placement of an article to be stacked based on the state variable S including placement information of the stacking area (stacking status data S1) and information concerning the article (article property data S2).

Model Update Section 114

The model update section 114 updates the correlation model M so that the error E may be reduced. The learning section 110 repeatedly updates the correlation model M for estimating a placement of the article to be stacked based on the stacking status of the stacking area (stacking status data S1) and the information concerning the article (article property data S2).

An initial value of the correlation model M is a value expressing the correlation between the state variable S and the article placement data L1, in a simplified manner (for example, linear function). The initial value of the correlation model M is given to the learning section 110 before the start of supervised learning. The teacher data T can be configured using empirical values obtained from article stacking operations performed by a worker in the present invention, and are given to the learning section 110 as needed at an early stage of operation of the article stacking apparatus 1. The error calculation section 112 identifies a correlation feature, which implies the correlation between both of placement information of the stacking area (stacking status data S1) and property information of an article (article property data S2) and a placement of the article to be stacked (article placement data L1), from the teacher data T. The error calculation section 112 further finds an error E (a deviation) between the identified correlation feature and the correlation model M, the correlation model M corresponding to the state variable S and the label data L in the current state. The model update section 114 updates the correlation model M so that the error E may be reduced, in accordance with predetermined update rules.

In the next learning cycle, the error calculation section 112 determines sorting of articles to be stacked in accordance with the updated correlation model M using the state variable S for a comparison with the article placement data L1 of the label data L actually acquired. Further the error calculation section 112 finds an error E (a deviation) between the sorted articles and the label data L actually acquired. The model update section 114 then updates the correlation model M again. This gradually reveals the correlation between the current state of the unknown environment (e.g., unknown stacking area) and an estimate of a placement of article to be stacked in the unknown environment.

Neural Network

Figure 7A:
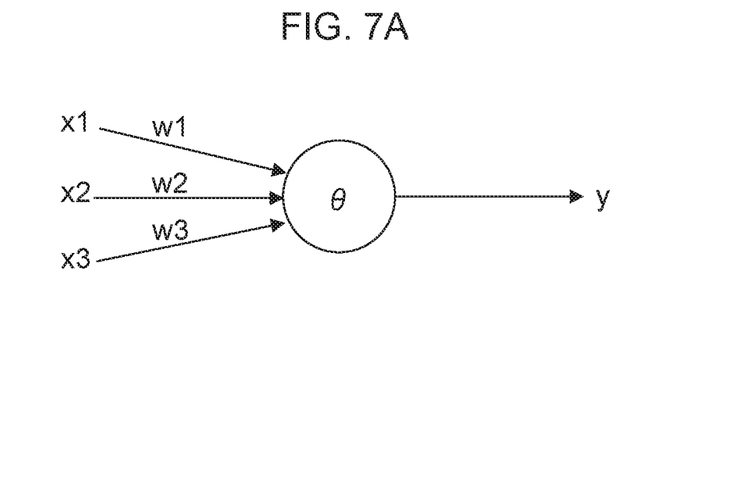
FIG. 7A is a view for explaining a neuron.
Figure 7B:
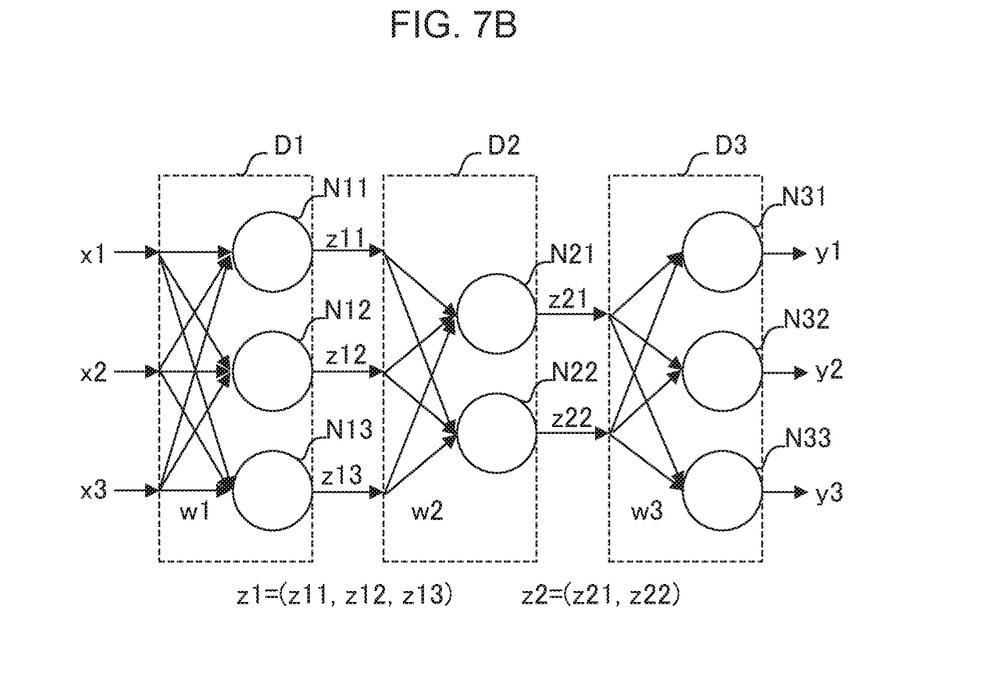
FIG. 7B is a view for explaining a neural network.

To advance the aforementioned supervised learning, a neural network can be used. FIG. 7A schematically shows a model of a neuron. FIG. 7B schematically shows a model of a three-layer neural network configured by combining neurons shown in FIG. 7A. A neural network can be configured using an arithmetic unit or a memory unit that replicates a model of a neuron.

The neuron shown in FIG. 7A is configured to output a result y for a plurality of inputs x (here, as one example, inputs $x_1$ to $x_3$). Each of the inputs $x_1$ to $x_3$ is multiplied by a weight w ($w_1$ to $w_3$) corresponding to the input x. This causes the neuron to output a result y expressed by the following expression (1). It should be noted that all of the input x, the result y, and the weight w are vectors in expression (1). Further, $\theta$ is a bias, and $f_k$ is an activating function.

$$y = f_k(\Sigma_{i=1}^{n} x_i w_i - \theta) \tag{1}$$

The three-layer neural network shown in FIG. 7B receives a plurality of inputs x (here, as one example, inputs x1 to x3) from the left side and outputs results y (here, as one example, results y1 to y3) from the right side. In the illustrated example, the inputs x1, x2, and x3 are multiplied by corresponding weights (collectively expressed as w1), and each of the inputs x1, x2, and x3 is inputted to three neurons N11, N12, and N13.

In FIG. 7B, outputs from the neurons N11 to N13 are collectively represented by z1. z1 can be regarded as a feature vector obtained by extracting feature values of an input vector. In the illustrated example, each element of the feature vector z1 is multiplied by corresponding weights (collectively represented by w2), and each element of the feature vector z1 is inputted to two neurons N21 and N22. The feature vector z1 represents a feature between the weight $w_1$ and the weight w2.

Furthermore, outputs from the neurons N21 and N22 are collectively represented by z2. z2 can be regarded as a feature vector obtained by extracting feature values of the feature vector z1. In the illustrated example, each element of the feature vector z2 is multiplied by corresponding weights (collectively represented by w3), and each element of the feature vector z2 is inputted to three neurons N31, N32, and N33. The feature vector z2 represents a feature between the weight w2 and the weight w3. Finally, the neurons N31 to N33 output results y1 to y3, respectively.

It should be noted that a technique, known as deep learning, which uses a neural network having three or more layers, can be used.

The learning section 110 of the machine learning apparatus 100 performs multi-layer calculation in accordance with the above-described neural network. The learning section 110 receives the state variable S as the input x, and outputs a placement of an article to be stacked (result y) with respect to placement information on the stacking area (stacking status data S1) and property information of the article (article property data S2). It should be noted that operation modes of the neural network include a learning mode and a value prediction mode. Weights w are learned using a learning data set in the learning mode, and the value of an action can be determined using the learned weights w in the value prediction mode. It should be noted that, in the value prediction mode, detection, classification, and reasoning, can also be performed.

Machine Learning Method

The above-described configuration of the machine learning apparatus 100 can be described as a machine learning method (or software) that the processor 101 executes. This machine learning method is a machine learning method for determining an estimate of a placement of an article to be stacked based on placement information on the stacking area and property information of the article, and placement information of the article in the setting area. The machine learning method includes the steps of observing a state variable S representing the current state, wherein the state variable includes the stacking status of the stacking area (stacking status data S1) and property information of the article in the setting area and to be stacked in the stacking area (article property data S2);

acquiring the label data L, wherein the label data L includes a placement of the article in the setting area and to be stacked in the stacking area; and learning a correlation between (i) the article placement data L1 and (ii) the stacking status data S1 and the article property data S2, using the state variable S and the label data L.

A learnt model obtained from learning by the learning section 110 of the machine learning apparatus 100 can be used as a program module of software involved in machine learning. The learnt model of the present invention can be used in a computer including a processor such as a CPU or a GPGPU and a memory. More specifically, a processor of a computer operates in accordance with commands from a learnt model stored in a memory. The processor performs calculation using placement information of the stacking area (stacking status data S1) and property information of an article (article property data S2) as inputs, and outputs an estimated placement of the article to be stacked based on a result of the calculation. The learnt model of the present invention can be copied onto other computers through an external storage medium or a network to be used on the computers.

When a copy of the learnt model of the present invention is used on other computers in a new environment, further learning can be performed with respect to the learnt model based on a new state variable and new determination data obtained in the new environment. In this case, a learnt model (hereinafter referred to as a derived model) derived from the learnt model due to the environment can be obtained. Similar to the original learnt model, the derived model of the present invention also outputs an estimate of a placement of an article to be stacked based on predetermined placement information of the stacking area (stacking status data S1) and predetermined property information of the article (article property data S2). However, a difference between the derived model and the original learnt model is that the derived model outputs a result more suitable for the new environment (new stacking area and article) than the original learnt model. This derived model can also be copied onto other computers through an external storage medium or a network, to be used on the computers.

Distillation

Further, a learnt model (called as a distilled model) on other machine learning apparatuses) can be created by performing learning from scratch using an output of the machining learning apparatus having the learnt model of the present invention incorporated therein. The learning process is called distillation. In distillation, the original learnt model is called a teacher model, and the distilled model newly created is called a student model. Generally, a distilled model has a smaller size than an original learnt model, but has an accuracy equivalent to that of the original learnt model. Accordingly, a distilled model is more suitable for deployment to other computers through an external storage medium or a network.

Multiple Article Stacking Apparatuses

Figure 9:
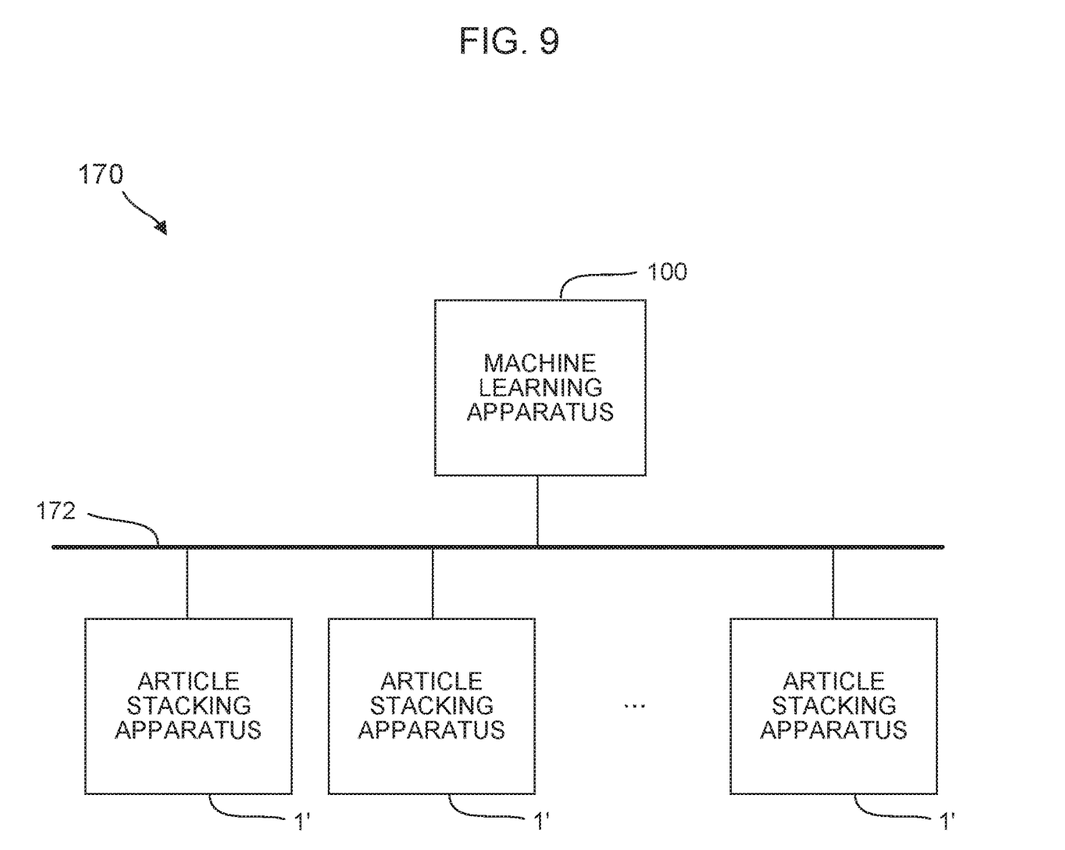
FIG. 9 is a schematic functional block diagram showing one aspect of a system into which the article stacking apparatus is incorporated.

FIG. 9 shows a system 170 according to one embodiment including a plurality of article stacking apparatuses 1'.

The system 170 includes the machine learning apparatus 100, a plurality of article stacking apparatuses 1' (not including the machine learning apparatus 100) each including the control section 34 for controlling the robot 70 that performs at least the same work, and a wired/wireless network 172 connecting these article stacking apparatuses 1' and the machine learning apparatus 100.

In the system 170, the machine learning apparatus 100 can learn features implying the correlation between both of the stacking status of the stacking area (stacking status data S1) and property information of an article to be stacked (article property data S2) and a placement of the article to be stacked (article placement data L1) from stacking operations respectively performed by workers in the plurality of article stacking apparatuses 1'. Accordingly, the system 170 can improve the speed and the reliability of learning by inputting a wider variety of data sets (including the state variable S and the determination data D). Further, the system 170 can be configured such that a result of learning by the machine learning apparatus 100 can be shared among the plurality of article stacking apparatuses 1'.

While the embodiment of the present invention has been described above, the present invention is not limited to the above-described exemplary embodiment, and can be carried out in various aspects by making appropriate modifications thereto.

The learning algorithm that the machine learning apparatus 100 executes, the arithmetic algorithm that the machine learning apparatus 100 executes, the control algorithm that the article stacking apparatus 1 executes, are not limited to the above-described ones, and various algorithms can be employed.

Moreover, though the article stacking apparatus 1 and the machine learning apparatus 100 are apparatuses having different CPUs (processors) in the above-described embodiment, the machine learning apparatus 100 may be realized using the CPU 11 of the article stacking apparatus 1 and the system programs stored in the ROM 12.

Further, in the above-described embodiment, an example in which the machine learning apparatus 100 is on the article stacking apparatus 1 is shown. However, the machine learning apparatus 100 may be on a cloud server or the like prepared on a network.

The invention claimed is:

1. An article stacking apparatus for controlling a robot to stack a plurality of articles from a setting area into a stacking area, wherein the plurality of articles were previously set in the setting area, the article stacking apparatus comprising:
a machine learning apparatus for determining an estimate placement to stack an article, of the plurality of articles, into the stacking area by the robot, wherein, during a learning phase, the plurality of articles were previously set in a setting area and moved by a worker to the stacking area, said machine learning apparatus including:
a label data acquisition section for acquiring label data of the article to be stacked, the label data including article placement data indicating a past placement of the article in the stacking area based on previously collected data, wherein the previously collected data is obtained while the article was previously set in the setting area,
a state observation section for observing a state variable representing a current state of the plurality of articles set in the setting area to be stacked by the robot, and an environmental state of the stacking area, the state variable including:
article property data indicating properties of the plurality of articles in the setting area to be stacked by the robot, and
stacking status data indicating a stacking status of the stacking area, the stacking status including stacking information of articles already placed in the stacking area, a learning section for learning a correlation between: (i) the label data obtained in the label acquisition section, and (ii) the state variable including the article property data and the stacking status data, and an estimation result output section configured to determine the estimate placement of the article, of the plurality of articles, to be stacked by the robot into the stacking area based on the correlation of the label data and the state variable learned by the learning section, wherein the article stacking apparatus is configured to control the robot to stack the article, of the plurality of articles, into the stacking area based on the determined estimate placement.

2. The article stacking apparatus according to claim 1, wherein the article placement data further indicates a temporary placement of the article.

3. The article stacking apparatus according to claim 1, wherein the learning section includes an error calculation section for calculating an error between an output of a correlation model and a correlation feature, the correlation model deriving the article placement data from the stacking status data and the article property data, the correlation feature being identified from teacher data prepared in advance, and a model update section for updating the correlation model to reduce the error.

4. The article stacking apparatus according to claim 1, wherein the learning section calculates the state variable and the label data using a multi-layered structure.

5. The article stacking apparatus according to claim 1, wherein the estimation result output section is configured to output a result of the determination of the estimate placement of the article in the stacking area.

6. The article stacking apparatus according to claim 1, wherein the machine learning apparatus is on a cloud server.

7. The article stacking apparatus according to claim 1, wherein the estimation result output section is configured to determine the estimate placement of the article using the state variable and the label data acquired by the label data acquisition section and the state observation section from operations performed by workers with a plurality of article stacking apparatuses.

8. A machine learning apparatus for determining an estimate placement for a robot to stack an article, of a plurality of articles, into a stacking area, wherein during a learning phase, the plurality of articles were previously set in a setting area and moved by a worker to the stacking area, the machine learning apparatus comprising:

a label data acquisition section for acquiring label data of the article to be stacked, the label data including article placement data indicating a past placement of the article in the stacking area based on previously collected data, wherein the previously collected data is obtained while the article was previously set in the setting area, a state observation section for observing a state variable representing a current state of the plurality of articles set in the setting area to be stacked by the robot, and an environmental state of the stacking area, the state variable including:

article property data indicating properties of the plurality of articles in the setting area to be stacked by the robot, and stacking status data indicating a stacking status of the stacking area, the stacking status including stacking information of articles already placed in the stacking area, a learning section for learning a correlation between: (i) the label data obtained in the label acquisition section, and (ii) the state variable including the article property data and the stacking status data, and an estimation result output section configured to determine the estimate placement of the article, of the plurality of articles, to be stacked by the robot into the stacking area based on the correlation of the label data and the state variable learned by the learning section.

\* \* \* \* \*